(12) United States Patent
Yoshida et al.

(10) Patent No.: US 11,015,763 B2
(45) Date of Patent: May 25, 2021

(54) EXPANSION TURBINE AND COMPRESSOR-TYPE HIGH-PRESSURE HYDROGEN FILLING SYSTEM AND CONTROL METHOD FOR SAME

(71) Applicant: TOKICO SYSTEM SOLUTIONS, LTD., Yokohama (JP)

(72) Inventors: Jun Yoshida, Kudamatsu (JP); Yukihiro Mimaki, Kudamatsu (JP); Eito Matsuo, Omura (JP)

(73) Assignee: TOKICO SYSTEM SOLUTIONS, LTD., Yokohama (JP)

( * ) Notice: Subject to any disclaimer, the term of this patent is extended or adjusted under 35 U.S.C. 154(b) by 157 days.

(21) Appl. No.: 16/076,210

(22) PCT Filed: Feb. 9, 2017

(86) PCT No.: PCT/JP2017/004669
§ 371 (c)(1),
(2) Date: Aug. 7, 2018

(87) PCT Pub. No.: WO2017/145769
PCT Pub. Date: Aug. 31, 2017

(65) Prior Publication Data
US 2019/0178446 A1    Jun. 13, 2019

(30) Foreign Application Priority Data

Feb. 23, 2016  (JP) .............................. JP2016-032072
Feb. 23, 2016  (JP) .............................. JP2016-032073

(51) Int. Cl.
*F17C 5/00*   (2006.01)
*F17C 5/06*   (2006.01)

(52) U.S. Cl.
CPC ................ *F17C 5/007* (2013.01); *F17C 5/06* (2013.01); *F17C 2205/0142* (2013.01);
(Continued)

(58) Field of Classification Search
CPC .... F17C 5/00; F17C 5/06; F17C 5/007; F17C 2223/0123; F17C 2223/036;
(Continued)

(56) References Cited

U.S. PATENT DOCUMENTS 6,792,981 B1 * 9/2004 Manning ................... F17C 5/06
                                                              141/18
9,127,594 B2 * 9/2015 Dany ........................ F02C 1/02
(Continued)

FOREIGN PATENT DOCUMENTS

CA    2916354 A1 *  1/2015  ................ F17C 5/06
CA    2917150 A1 *  1/2015  ............... F17C 5/007
(Continued)

OTHER PUBLICATIONS

Dynamic gas bearing turbine technology in hydrogen plants—Ohlig et al. (Jun. 2012) (Year: 2012).*

*Primary Examiner* — Len Tran
*Assistant Examiner* — Jenna M Hopkins
(74) *Attorney, Agent, or Firm* — Oliff PLC

(57) ABSTRACT

An expansion turbine/compressor type high-pressure hydrogen gas filling system is simple in configuration, low in site work cost, small in the burden of maintenance work, and capable of reducing the operating cost including cost of power consumption, and it is not necessary to separately provide a way to take out the energy produced in the expansion equipment and effectively use outside such as generator, and that can be applied for temperature lowering system technology such as pre-cooler function in the final filling portion of the hydrogen station, the expansion turbine portion has with a process to incorporate the expansion turbine/compressor in the expansion turbine portion in the filling system to do the enthalpy lowering of the hydrogen gas using the expansion turbine, when the hydrogen gas (Continued)

accumulated at high pressure is pressurized and filled into the tank.

10 Claims, 9 Drawing Sheets

(52) U.S. Cl.
CPC ...... *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0185* (2013.01); *F17C 2227/0337* (2013.01); *F17C 2260/023* (2013.01); *F17C 2265/065* (2013.01); *F17C 2270/0184* (2013.01); *Y02E 60/32* (2013.01)

(58) Field of Classification Search
CPC ........ F17C 2227/085; F17C 2227/0185; F17C 2221/012; F17C 2205/0142; F17C 2225/0123; Y02E 60/32
See application file for complete search history.

(56) References Cited

U.S. PATENT DOCUMENTS

| | | | | |
|---|---|---|---|---|
| 9,182,170 | B2* | 11/2015 | Rooks | F17C 5/00 |
| 9,784,409 | B2* | 10/2017 | Aigouy | F17C 5/06 |
| 9,810,129 | B2* | 11/2017 | Zhou | F02G 5/04 |
| 9,982,843 | B2* | 5/2018 | Kawai | B64D 37/30 |
| 10,077,871 | B2* | 9/2018 | Blanchet | F17C 5/06 |
| 10,571,077 | B2* | 2/2020 | Seki | F17C 5/06 |
| 2002/0163200 | A1* | 11/2002 | Oglesby | F02C 1/02 |
| | | | | 290/52 |
| 2005/0210914 | A1* | 9/2005 | Allam | F25J 1/0065 |
| | | | | 62/607 |
| 2005/0266293 | A1* | 12/2005 | Delzanno | H01M 8/04186 |
| | | | | 429/415 |
| 2006/0016512 | A1* | 1/2006 | Takano | F17C 13/026 |
| | | | | 141/82 |
| 2006/0053792 | A1* | 3/2006 | Bourgeois | C25B 15/08 |
| | | | | 60/670 |
| 2008/0110421 | A1* | 5/2008 | Flessner | F02B 43/08 |
| | | | | 123/3 |
| 2008/0127673 | A1* | 6/2008 | Bowen | F25J 1/0284 |
| | | | | 62/611 |
| 2009/0250138 | A1* | 10/2009 | Bavarian | F17C 7/00 |
| | | | | 141/4 |
| 2010/0219066 | A1* | 9/2010 | Takeuchi | C25B 1/04 |
| | | | | 204/242 |
| 2010/0307636 | A1* | 12/2010 | Uemura | F17C 5/06 |
| | | | | 141/4 |
| 2011/0297346 | A1* | 12/2011 | Minta | F25J 1/0277 |
| | | | | 165/10 |
| 2012/0132301 | A1* | 5/2012 | Hobmeyr | F17C 5/06 |
| | | | | 137/561 R |
| 2012/0227864 | A1* | 9/2012 | Mori | F17C 5/06 |
| | | | | 141/95 |
| 2012/0240600 | A1* | 9/2012 | Paulus | F25J 1/0214 |
| | | | | 62/48.2 |
| 2012/0267002 | A1* | 10/2012 | Kittilsen | F17C 5/06 |
| | | | | 141/4 |
| 2013/0037165 | A1* | 2/2013 | Okawachi | F17C 5/06 |
| | | | | 141/4 |
| 2013/0305744 | A1* | 11/2013 | Laursen | B01D 5/006 |
| | | | | 62/6 |
| 2015/0007585 | A1* | 1/2015 | Kawai | B64D 37/30 |
| | | | | 62/48.2 |
| 2015/0068222 | A1* | 3/2015 | Hakamada | F25J 1/005 |
| | | | | 62/48.2 |
| 2015/0068641 | A1* | 3/2015 | Aigouy | F17C 5/06 |
| | | | | 141/4 |
| 2015/0096289 | A1* | 4/2015 | Pedretti-Rodi | F02C 6/16 |
| | | | | 60/327 |
| 2015/0308622 | A1* | 10/2015 | Koonce | F17C 5/06 |
| | | | | 141/4 |
| 2016/0123536 | A1* | 5/2016 | Grimmer | F17C 13/04 |
| | | | | 141/4 |
| 2016/0187033 | A1* | 6/2016 | Alford | F25B 13/00 |
| | | | | 62/498 |
| 2016/0204456 | A1* | 7/2016 | Mueller | H01M 8/0494 |
| | | | | 429/429 |
| 2016/0273713 | A1* | 9/2016 | Lee | F17C 5/06 |
| 2016/0281928 | A1* | 9/2016 | Yoshida | F17C 5/06 |
| 2016/0348551 | A1* | 12/2016 | Paul | F02B 9/10 |
| 2017/0207469 | A1* | 7/2017 | Kaneko | H01M 8/04111 |
| 2018/0023763 | A1* | 1/2018 | Ravinel | F17C 5/04 |
| | | | | 62/87 |
| 2018/0066799 | A1* | 3/2018 | Ravinel | F17C 7/00 |
| 2019/0056174 | A1* | 2/2019 | Ragot | F25J 1/0288 |

FOREIGN PATENT DOCUMENTS

| | | | | | |
|---|---|---|---|---|---|
| CA | | 2938391 | A1 * | 8/2015 | ............ F17C 5/06 |
| CA | | 2938392 | A1 * | 8/2015 | ............ F17C 5/007 |
| CA | | 2948303 | A1 * | 11/2015 | ........... F17C 13/025 |
| CA | | 2965772 | A1 * | 5/2016 | ............ F17C 5/06 |
| EP | | 3076017 | A1 * | 10/2016 | ............ F17C 1/00 |
| FR | | 2960041 | A1 * | 11/2011 | ............ F17C 5/06 |
| FR | | 2973858 | A1 * | 10/2012 | ............ F17C 5/06 |
| JP | | 2016153656 | A * | 8/2016 | ............ F17C 5/06 |
| WO | WO-2009013415 | | A1 * | 1/2009 | ............ F17C 5/06 |
| WO | WO-2012147340 | | A1 * | 11/2012 | ........... F17C 13/026 |
| WO | WO-2015065996 | | A1 * | 5/2015 | ........... F17C 11/007 |

\* cited by examiner

EXPANSION TURBINE AND COMPRESSOR-TYPE HIGH-PRESSURE HYDROGEN FILLING SYSTEM AND CONTROL METHOD FOR SAME

ART FIELD

This invention concerns the expansion turbine and compressor-type high-pressure hydrogen filling system and control method for same to be applied for temperature lowering system such as pre-cooler function at the final filling portion of the hydrogen filling equipment (hereinafter may be called "hydrogen station") to fill the hydrogen gas to be the fuel for the hydrogen automobile such as fuel cell automobile (hereinafter may be just called "hydrogen automobile") into the fuel tank of the hydrogen automobile from the hydrogen gas supply source.

BACKGROUND ART

The hydrogen gas to be used as the fuel of the hydrogen automobile has such characteristic that if high pressure becomes adiabatic expansion (isenthalpic expansion) at such portion as expansion valve provided in the route to fill the hydrogen gas, it becomes the expansion in an area where the temperature is higher than the inversion point (−58 C) because of its property, and due to the Joule Thomson effect, the temperature after the expansion rises.

When, therefore, the hydrogen gas to be the fuel of the hydrogen automobile is filled into the fuel tank of the hydrogen automobile from the hydrogen gas supply source at the hydrogen station, the temperature of the hydrogen gas rises at such a portion as expansion valve provided in the route to fill the hydrogen gas.

Since this temperature rise of the hydrogen gas becomes remarkable as the expansion ratio of the hydrogen gas increases, as the gas supplied from the hydrogen gas supply source at the hydrogen station becomes higher in pressure, for example, the pressure of the supplied gas (tank pressure of the supply source) becomes higher from 45 to 70 MPa (G), further to 82 MPa (G), the self-temperature rise increases.

As an example, FIG. 1 shows self-temperature changes at each secondary pressure when the hydrogen gas is expanded in one stage from the tank pressure of the supply source 70 MPa(G), 30 C.

For the fuel cell vehicle the dissemination of which has been started, the highest temperature during hydrogen filling is limited to 85 C due to the temperature restriction of the material of the fuel tank and restriction of operating temperature of the fuel cell itself.

From the above hydrogen nature, if the hydrogen gas is filled without taking any means, the temperature when the hydrogen is filled will exceed the maximum temperature limit of 85 C and there are temperature restrictions due to the material of the fuel tank and operating temperature of the fuel cell itself and also the problem of pressure drop accompanying the cooling after filling will occur, and therefore, a method to arrange a cooling means such as heat exchanger in the route to fill the hydrogen gas and to fill the hydrogen gas into the hydrogen automobile while cooling the hydrogen gas by this means was proposed and put to practical use (e.g. patent literature 1).

PRIOR ART LITERATURE

Patent literature

Patent literature Gazette No. P2004-116619A

OUTLINE OF INVENTION

Problems to be Solved by the Invention

Here, FIG. 2 shows the block diagram of presently ordinary hydrogen station of 70 MPa(G) (source: "NEDO hydrogen energy white paper"). This hydrogen station is equipped with compressor equipment 1 consisting of compressor unit to receive the hydrogen gas, hydrogen accumulating equipment 2 consisting of accumulator unit to accumulate the hydrogen gas sent from the compressor equipment 1, expansion valve 3 provided in the route to fill the hydrogen gas from the hydrogen accumulating equipment 2 into the fuel tank 6 of the hydrogen automobile, hydrogen pre-cooler 4, and hydrogen pre-cool system 5 to cool the hydrogen gas via the pre-cooler 4, and the hydrogen pre-cool system 5 is equipped with refrigerator equipment 7 consisting of compressor, condenser, expansion valve, evaporator and accumulator, and brine circuit system 8 consisting of brine tank, primary brine pump and secondary pump.

With this hydrogen station, both onsite and offsite types, the hydrogen received is compressed to the medium pressure (40 MPa(G) in the illustration) and high pressure (82 MPa (G) in the illustration) by the compressor equipment 1 and held in the form of compressed gas at each pressure in the compressor equipment 1.

In order to fill the hydrogen gas into the fuel tank 6 installed on the vehicle on the demand side, expansion is used via the expansion valve 3 but at that time, since it is accompanied by the temperature rise of the hydrogen gas itself, it is cooled to −40 C by the hydrogen pre-cool system 5, outside equipment.

With the present technology, the hydrogen pre-cool system 5 is composed of the combination of ordinary refrigerator equipment 7 such as CFC refrigerant and brine circuit 8 to operate at around 40 C, and therefore, the composition is complicated, requiring many rotors including refrigerant compressor for refrigerator, primary brine pump and secondary brine pump.

For this reason, the hydrogen pre-cool station used to lower the temperature of hydrogen gas at the final filling portion of conventional hydrogen station involves the following problems.

1) The outside independent hydrogen pre-cool system itself is a system to be operated by external power. The ordinary hydrogen station (300 Nm3/h) operates at about 40 kW and the operation itself of the hydrogen pre-cool system increases the operating cost.
2) Since the refrigerator uses CFC (alternative CFC) as the refrigerant, the pre-cooler equipment itself is subjected to the refrigeration safety rule of the High Pressure Gas Safety Act, and the equipment and operation are restricted.
3) Since the CFC and brine are held in the station, it is necessary to take measures to prevent environmental accidents such as outside leakage of CFC and brine.
4) The hydrogen pre-cool system is complicated because of the two-stage composition of refrigerating circuit and brine circuit, and since many rotors such as refrigerant compressor and brine pumps exist, many maintenance/control duties are required.

5) Since the system is used via brine, time is required from operation start to steady state, and therefore, the hydrogen pre-cool system must be started long before the filling work to create the steady state within the system.

6) When the installation space of the hydrogen station itself is made smaller, the exclusive space of the hydrogen pre-cool system poses a restriction.

7) At the present temperature of −40 C, faster filling of hydrogen will be limited. In order to further shorten the filling time in the future, it may be necessary to precool to a lower temperature than the present temperature of −40 C.

By the way, in consideration of the problems of the hydrogen pre-cool system used for lowering the temperature of hydrogen gas at the final filling portion of the above conventional hydrogen station, the applicants proposed in the patent application 2015-059323 a hydrogen pre-cool system used to lower the temperature of hydrogen gas at the final filling portion of the hydrogen station that has a simple composition, smaller burden of maintenance work, and capable of reducing the operation cost including the cost of power consumption.

The hydrogen pre-cool system used for lowering the temperature of hydrogen gas at the final filling portion of the hydrogen station lowers the temperature of hydrogen gas by means of expansion equipment to take out the work in the process to expand and decompress the hydrogen gas and precools the hydrogen gas utilizing the cooling energy, and it can solve the problems of the hydrogen pre-cool system used to lower the temperature of the hydrogen gas at the final filling portion of the above conventional hydrogen station, but it had the following problem.

8) It is necessary to separately provide a means to take out and effectively use the energy produced in the expansion equipment.

In consideration of the problems of the conventional hydrogen gas pre-cool system used for lowering the temperature of the hydrogen gas at the final filling portion of the above conventional hydrogen station, this invention has the object of providing the expansion turbine and compressor-type high-pressure hydrogen filling system and control method for same that can be applied for the temperature lowering system technology that has a simple composition, less burden of maintenance work, and less burden of maintenance work and capable of reducing the site work cost and also capable of reducing the operating cost including the cost of power consumption, and not necessary to separately provide a means to take out the energy produced in the expansion equipment and effectively use it outside for generator, for example.

Means to Solve the Problems

In order to achieve the above objective, the expansion turbine/compressor type high-pressure hydrogen filling system of this invention is characterized in that the expansion turbine portion is equipped with a process to incorporate the expansion turbine/compressor in the filling system to do the enthalpy lowering of the hydrogen gas using the expansion turbine when the hydrogen gas accumulated at high pressure is pressurized and filled in the tank.

To be more specific, the expansion turbine/compressor can be composed of an impeller to do expansion action on one side of the rotor shaft of the rotor and an impeller on the other side to do the compression action to consume the rotational energy obtained by the expansion.

Furthermore, it can be equipped with bearings of a dynamic gas bearing system using the hydrogen gas supplied.

In this case, it can be composed of one unit of expansion turbine/compressor.

It is also possible to arrange multiple units of expansion turbine/compressor in series.

At the entrance portion on the expansion turbine side of the expansion turbine/compressor, a cooler can be provided.

At the entrance portion on the compressor side of the expansion turbine/compressor, a cooler can be provided.

To achieve the above objective, the control method of the expansion turbine/compressor-type high-pressure hydrogen filling system of this invention is characterized in that it is equipped with the process to incorporate the turbine/compressor in the expansion turbine portion in the control method of the filling system to do the enthalpy lowering of the hydrogen gas using the expansion turbine when the hydrogen gas accumulated at high pressure is filled into the tank, and a cooler installed at the entrance portion on the expansion turbine side, thus controlling the exit temperature of the hydrogen gas of the cooler.

In this case, the exit temperature of the hydrogen gas of the aforementioned cooler can be detected and the cold energy amount of the cooler can be adjusted to follow so that the exit temperature will become a proper temperature.

By allocating the filling time when the hydrogen gas is pressurized and filled into the hydrogen tank, it is possible to adjust the amount of cold energy of the cooler so that the optimum gas temperature can be obtained at each filling stage.

It is possible to adjust the cold energy of the cooler by detecting the tank pressure and temperature rise so that the optimum gas temperature is obtained at each filling stage.

Effects of the Invention

According to the expansion turbine/compressor type high-pressure hydrogen filling system of this invention, when the hydrogen gas accumulated at high pressure is pressurized and filled into the tank, process is provided to incorporate the expansion turbine/compressor in the expansion turbine system to do the enthalpy lowering of the hydrogen gas using the expansion turbine and the hydrogen is finally expanded and the hydrogen gas with the enthalpy lowered (temperature lowered) is filled into the adjusting tank side, thus making it possible to provide the hydrogen pre-cool system to be used for lowering the temperature of the hydrogen gas in the final filling portion of the hydrogen station having a simple composition, less burden of maintenance work and capable of reducing the operating cost including the cost of power consumption.

By providing the process to incorporate the expansion turbine/compressor in the expansion turbine portion or using the expansion turbine/compressor having the impeller for expansion on one side of the rotating shaft and the impeller for compression on the other side, it is no more necessary to separately provide the means to take out the energy produced in the expansion equipment and effectively utilize it, and furthermore, by increasing the pressure of the hydrogen gas utilizing the rotating energy obtained on the expansion turbine side so that it is introduced to the expansion turbine side, the expansion ratio of the expansion turbine is increased for the pressure rise by the compressor so that more heat drop (amount of cold generated) can be obtained.

Furthermore, by lowering the temperature of the hydrogen gas to a proper value by providing a cooler at the entrance portion of the expansion turbine side, it becomes possible to secure temperature allowance at the completion of tank filling and establish the process with an expansion turbine with lower efficiency.

By the way, the expansion equipment or turbine to be used for this process inevitably becomes a very small and fast rotor if it is designed with the capacity to meet the present standard hydrogen filling plate (hydrogen station), and in case of a system to fill the high pressure hydrogen gas of say 5 kg, the diameter of the expansion turbine will be 8 to 12 mm and the number of revolutions at the maximum expansion ratio will be equivalent to 1.2 million resolutions/minute.

Specifically the expansion turbine/compressor type high-pressure hydrogen of this invention is composed by providing an impeller (turbine) for expansion action on one side of the rotor shaft of the rotor and impeller (compressor) for compression action to consume the rotating energy obtained by expansion.

The energy taken out by the expansion of the hydrogen gas by the turbine is taken out as kinetic energy in the form of high-speed rotation of the turbine rotor, and to realize this high-speed rotation, the expansion turbine/compressor adopts the bearing of dynamic gas bearing system using the hydrogen gas supplied.

For this reason, the "work" taken out as the rotating energy can be such that the friction loss (shaft loss) due to the bearing is restricted to a very small value.

The energy of the amount obtained by deducting this shaft loss from the rotating energy obtained with the turbine is consumed by centrifugally raising the pressure of the process gas on the compressor side, the rotation is balanced.

That is, the rotating energy (turbine power) taken out by the turbine is consumed when the process gas is boosted by the compressor provided on the opposite side of the rotating shaft and driven at the same number of revolutions.

By using the bearing of this dynamic gas bearing system to form the bearing of such a small and high-speed rotor as in this invention, realization of the super-high-speed rotation and realization of very small shaft loss can be assured.

Like this, a closed system as the turbine/compressor can be made without power generation recovery of power recovery and recovery by taking out to the outside, the site work cost can be reduced with a simple composition.

The process gas pressure-raised on the compressor side is accompanied by pressure rise and temperature rise due to thermodynamic compression. The temperature rise is cooled to about 20 C as required by providing a cooler (air cooling or water cooling after cooler) is discarded outside as heat. Since the pressure rise contributes to the pressure rise at the turbine entrance, it further increases the expansion ratio in the turbine, and as a result, it has the effect of increasing the cold generation.

In this invention, the technical reason to utilize the power taken out by the turbine within the process by adopting the turbine/compressor without converting to the electric power with the generator is not so established because the generator itself becomes small and high frequency for the equipment of small and high-speed rotation, and for the process gas in the relationship with hydrogen, superiority is cited from the viewpoint of explosion prevention.

By arranging in series multiple units of the expansion turbine/compressor, it is possible to provide some room for the cold generation by operating the expansion/compressor in the maximum area of each expansion efficiency for the turbine efficiency.

By providing a cooler at the entrance portion on the expansion turbine side of the expansion turbine/compressor and/or at the entrance portion of the compressor side, it is possible to assist the temperature lowering of the hydrogen gas.

EMBODIMENTS TO IMPLEMENT THE INVENTION

Below the embodiments of the expansion turbine/compressor type high-pressure hydrogen filling system and the control method of this invention are explained in accordance with the drawings.

This expansion turbine/compressor type high-pressure hydrogen filling system has the expansion turbine/compressor type high-pressure hydrogen filling system of this invention applied for the hydrogen pre-cool system used to lower the temperature of the hydrogen gas at the final filling portion of the hydrogen station, and it is provided with a process to incorporate the expansion turbine/compressor in the expansion turbine portion in the filling system to do enthalpy lowering of the hydrogen gas using the expansion turbine when the hydrogen gas accumulated at high pressure is pressurized and filled in the tank.

Here the process to incorporate the expansion turbine/compressor is provided in the expansion turbine portion, and so in this embodiment, it is possible to use the turbine/compressor generally used for compression and expansion of refrigerant (called "expansion turbine/compressor" in this specification) having an impeller for expansion on one side of the rotating shaft and impeller for compression on the other side.

This expansion turbine/compressor can be provided with bearings (bearings to support both radial and thrust directions) of dynamic gas bearing system using the hydrogen gas supplied.

Figure 1:
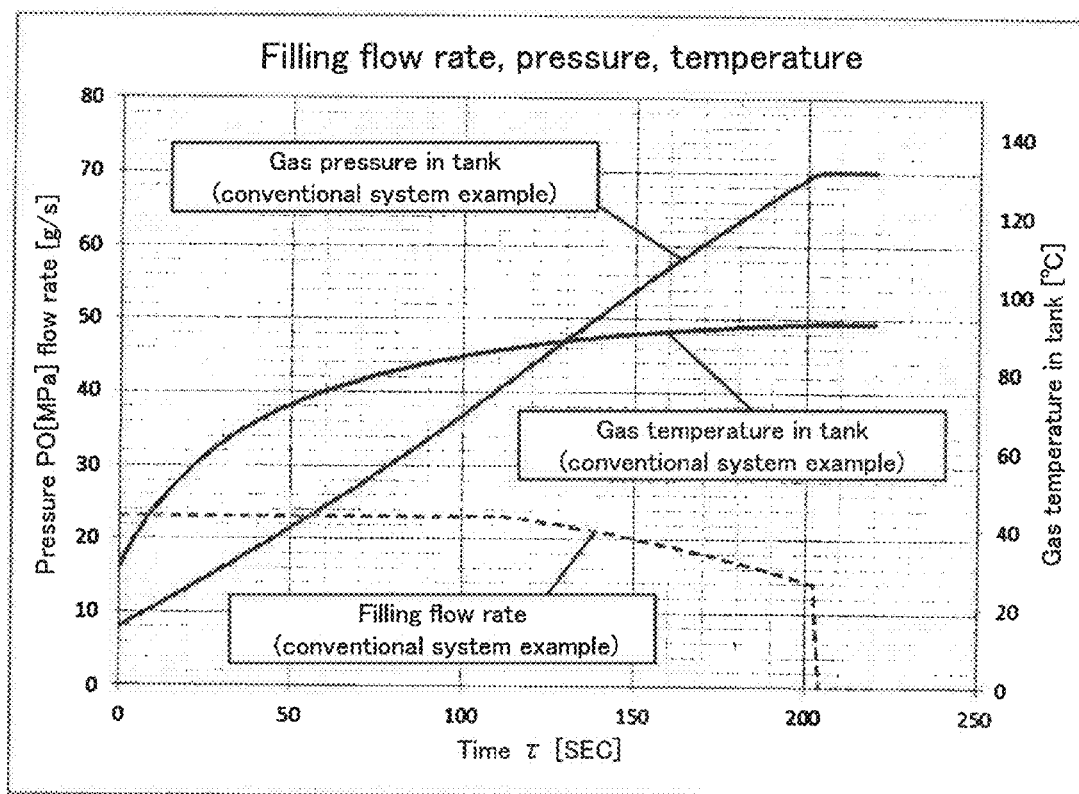
FIG. 1 Graph to show filling rate, pressure and temperature changes of hydrogen gas by means of expansion (valve expansion) using the expansion valve FIG. 2 Explanatory drawing of hydrogen station using the conventional hydrogen pre-cool system FIG. 3 Explanatory drawing to show an embodiment of expansion turbine/compressor type high-pressure hydrogen gas filling system of this invention FIG. 4 Explanatory drawing to show modified embodiment of expansion turbine/compressor type high-pressure hydrogen gas filling system of this invention FIG. 5 Graph to show filling rate and pressure changes of hydrogen gas by means of expansion (valve expansion) using expansion valve (conventional system) and expansion turbine/compressor type high-pressure hydrogen filling system (embodiment) of this invention FIG. 6 Graph to show temperature changes of hydrogen gas by means of expansion (valve expansion) using expansion valve (conventional system) and expansion turbine/compressor type high-pressure hydrogen gas filling system (embodiment)
Figure 2:
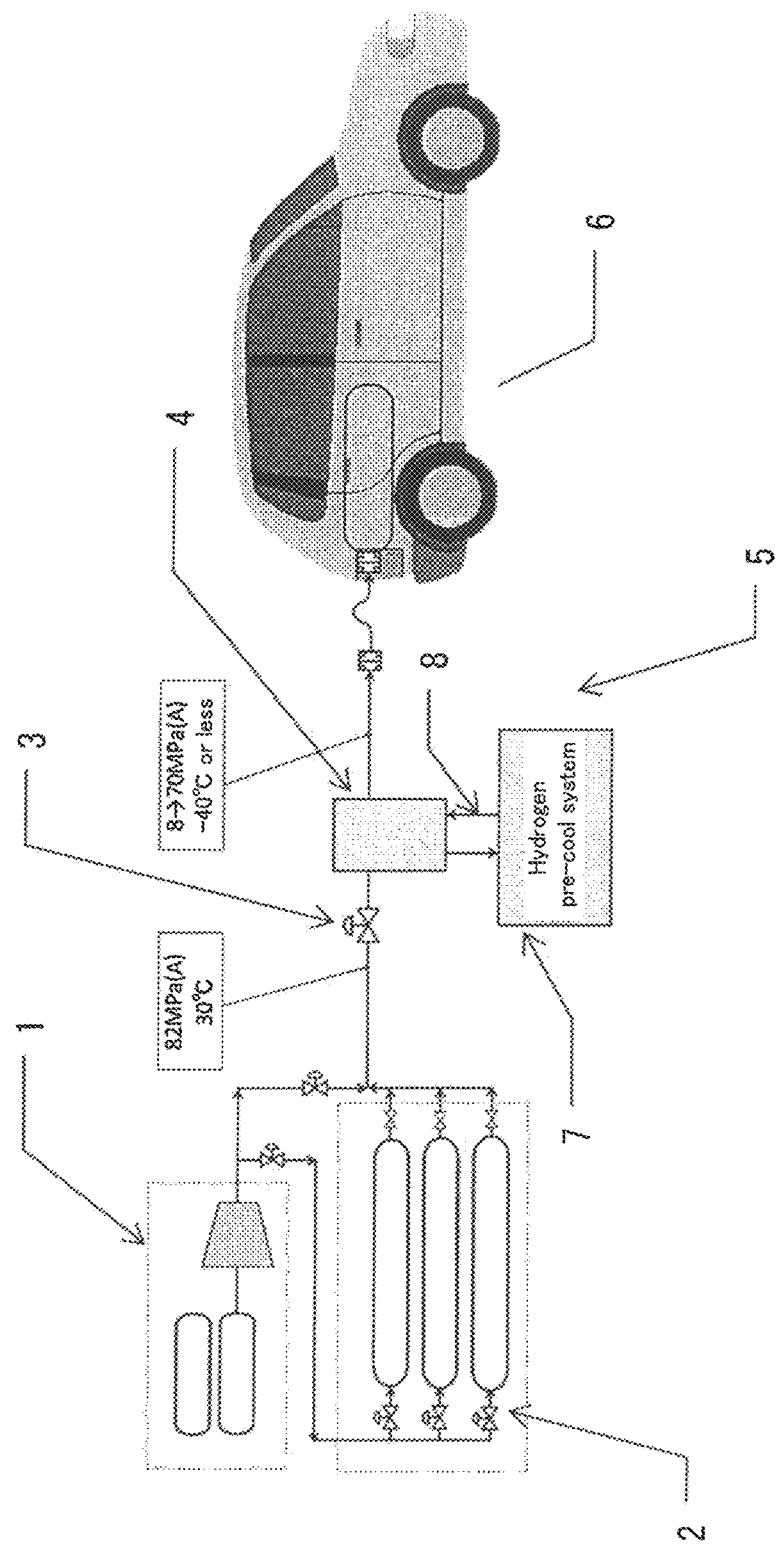
Figure 3:
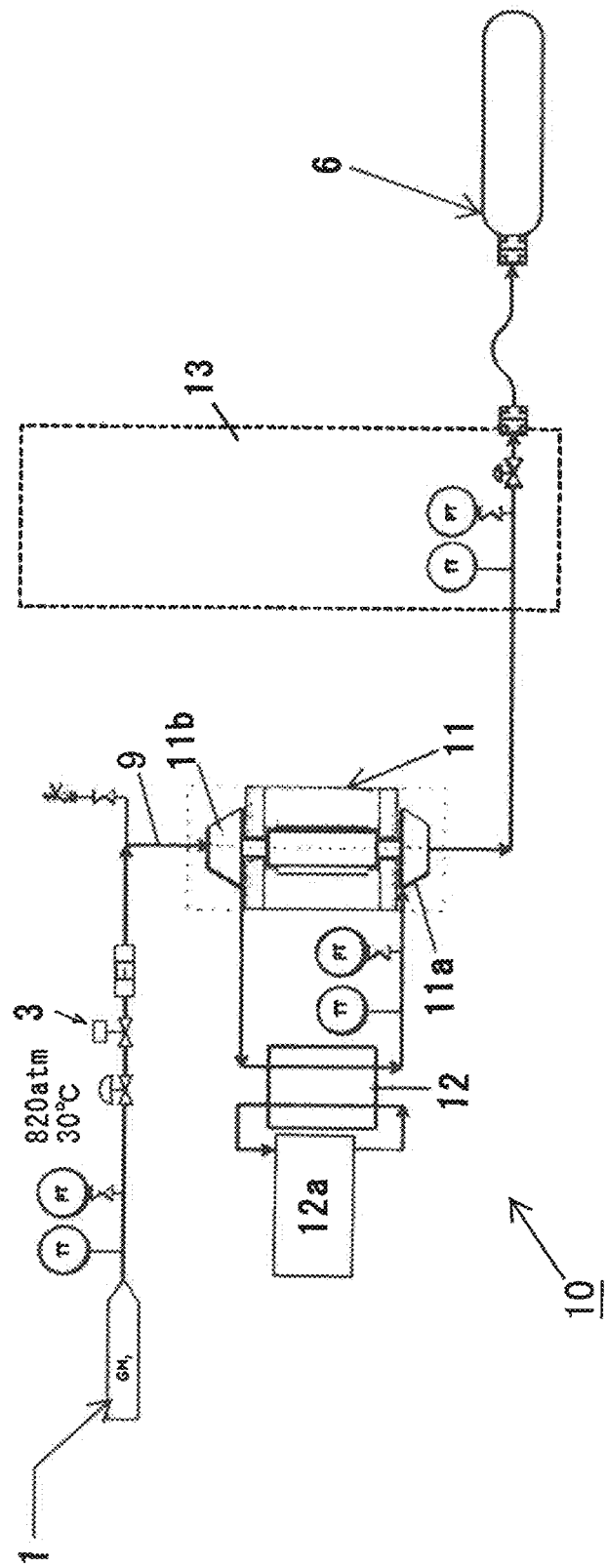

Specifically, like the final expansion mechanism of the hydrogen gas of the hydrogen station shown in FIG. 3, this hydrogen pre-cool system 10 has the hydrogen gas source line 9 connected to the circuit of the expansion turbine/compressor and the hydrogen gas subjected to enthalpy lowering (temperature lowering) is finally expanded by the expansion turbine/compressor 11 and filled in the fuel tank of a hydrogen automobile via the hydrogen gas supply unit 13.

Here, the expansion turbine/compressor 11 is provided with the expansion turbine 11a having the impeller for expansion on one side of the rotating shaft and compressor 11b having the impeller for compression on the other side, and by utilizing the rotating energy obtained on the expansion turbine 11a side, the pressure of the hydrogen gas is raised and the hydrogen gas is introduced to the entrance of the expansion turbine 11a (the hydrogen gas is supplied to the compressor 11b and then supplied to the expansion turbine 11a)) thus the expansion ratio of the expansion turbine 11a is increased for the pressure raised by the compressor 11b making it possible to obtain more heat drop (cold generation).

It is possible to provide a cooler 12 in the entrance portion on the expansion turbine 11a side of the expansion turbine turbine/compressor 11.

For the low temperature heat source 12a of the cooler 12, a water cooling system or chiller unit system can be used as preferably.

Though the illustration is omitted, a similar cooler can be installed in the entrance portion on the compressor 11b side. In this case, the cooler 12 provided in the entrance portion on the expansion turbine 11a side can be omitted.

This can assist the temperature lowering of the hydrogen gas, and by lowring the temperature of the hydrogen gas to a proper value, it becomes possible to secure room for the temperature at the completion of tank filling and establish the process with an expansion turbine of lower efficiency.

Figure 5:
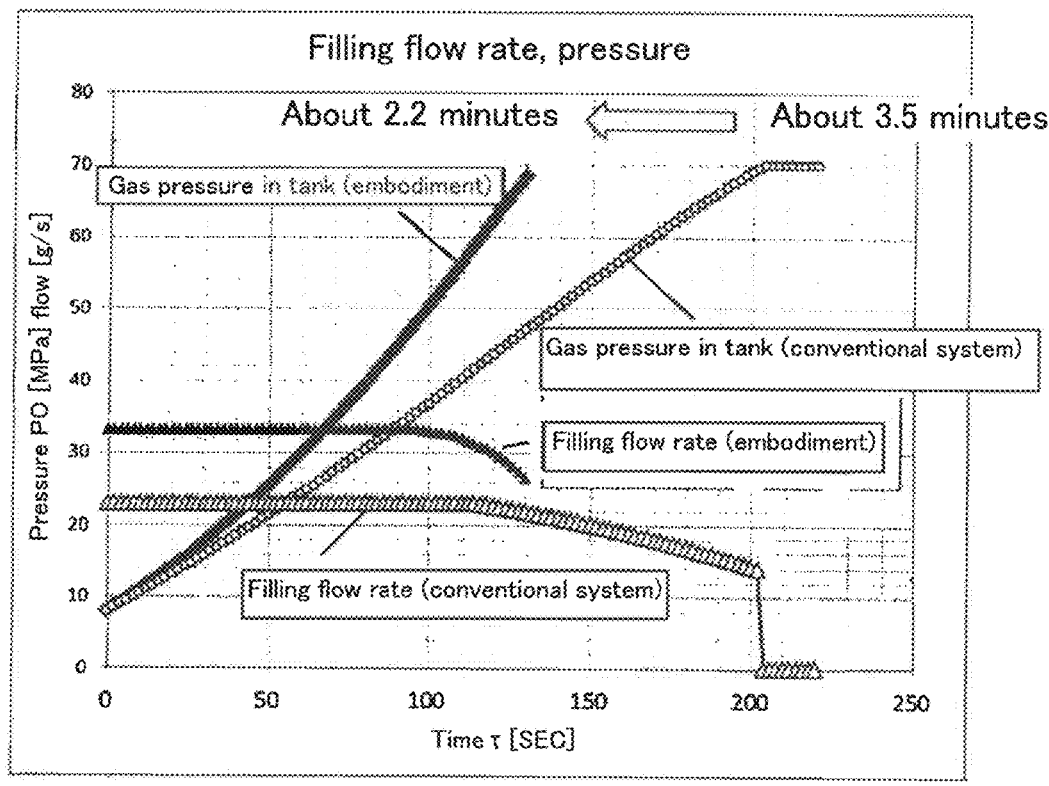
Figure 6:
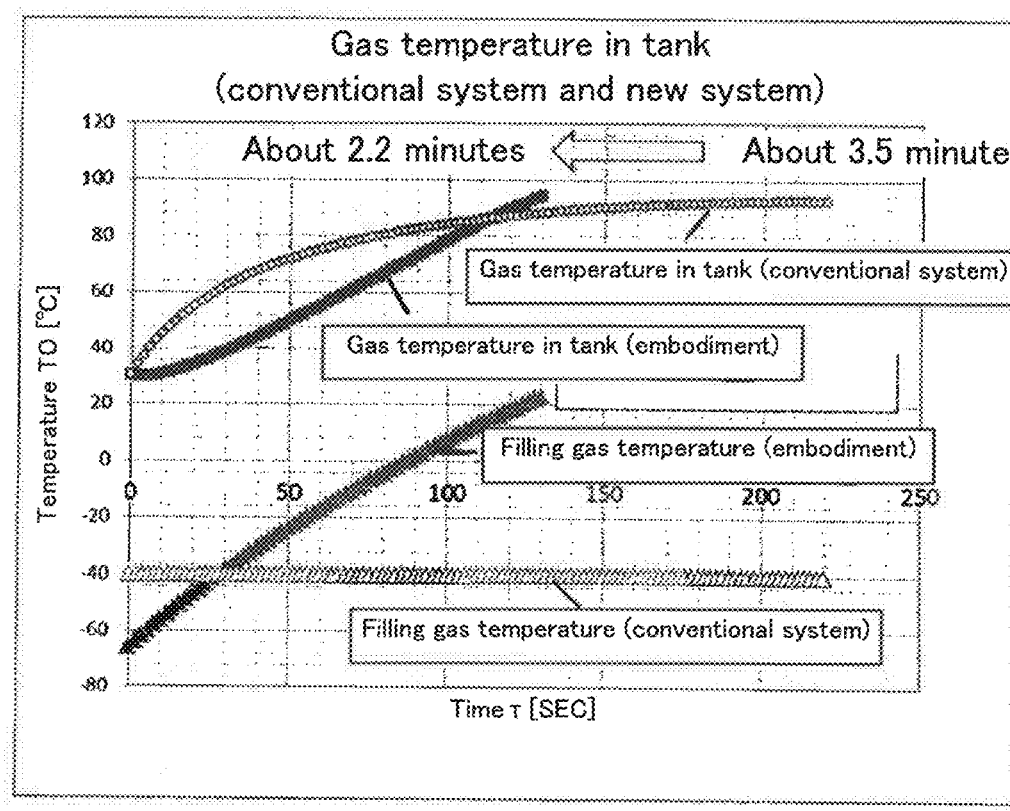

FIG. 5 and FIG. 6 show the filling flow rate and pressure and temperature changes by the expansion (valve expansion) using the expansion valve of hydrogen gas (conventional system) and the expansion turbine/compressor type high-pressure hydrogen filling system of this invention (embodiment).

By applying the expansion turbine/compressor type high-pressure hydrogen filling system of this invention for the hydrogen pre-cool system used for lowering the temperature of hydrogen gas in the final filling portion of a hydrogen station, it is possible to fill the hydrogen gas expanded by driving the expansion turbine/compressor 11 by utilizing the pressure difference from the high pressure (82 MPa) (main pressure) of the hydrogen gas source line 9 directly into the fuel tank of a hydrogen automobile.

In this case, since the difference between the main pressure and the pressure in the fuel tank 6 is large in the initial filling, the expansion ratio with the expansion turbine 11a and the expansion ratio by the compressor 11b can be secured rather large, and so more cold can be generated.

As the filling proceeds, the pressure in the fuel tank increases and the cold generated by the expansion turbine/compressor 11 decreases, but the filling can be finally completed at 85 C or lower.

Figure 4:
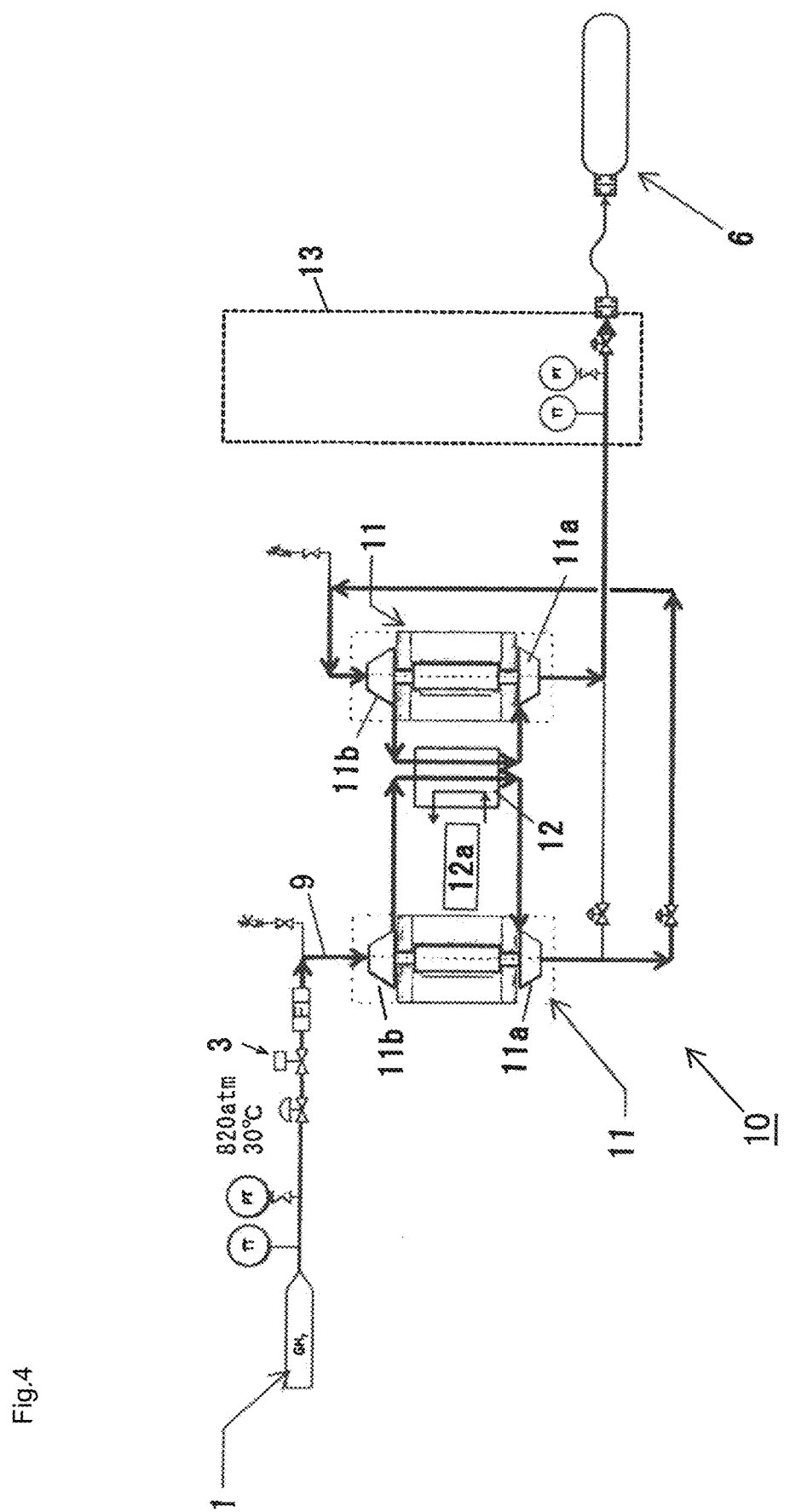

By the way, one unit of expansion turbine/compressor 11 is used in the embodiment shown in FIG. 3 but multiple units can be arranged in series as shown in the modified embodiment shown in FIG. 4, and the multiple units arranged in series can be arranged in parallel.

This makes it possible to operate the expansion turbine/compressor 11 with the expansion rate in the maximum area at each expansion ratio, secure room for the cost generation, easily increase the equipment flow rate, and make the filling equipment for large fuel cell bus and truck without a large pre-cool cooler. By the way, in the embodiment shown in FIG. 3 (same with the embodiment shown in FIG. 4), as shown in FIG. 7, the cooler 12 and controller 14 are provided in the entrance portion on the expansion turbine 11a side of the expansion turbine/compressor 11 so as to control the exit temperature of the hydrogen gas of the cooler 12.

Such configuration can properly lower the exit temperature of hydrogen gas of the cooler 12, thus making it possible to secure some room for the temperature in the fuel tank at completion of filling.

Figure 7:
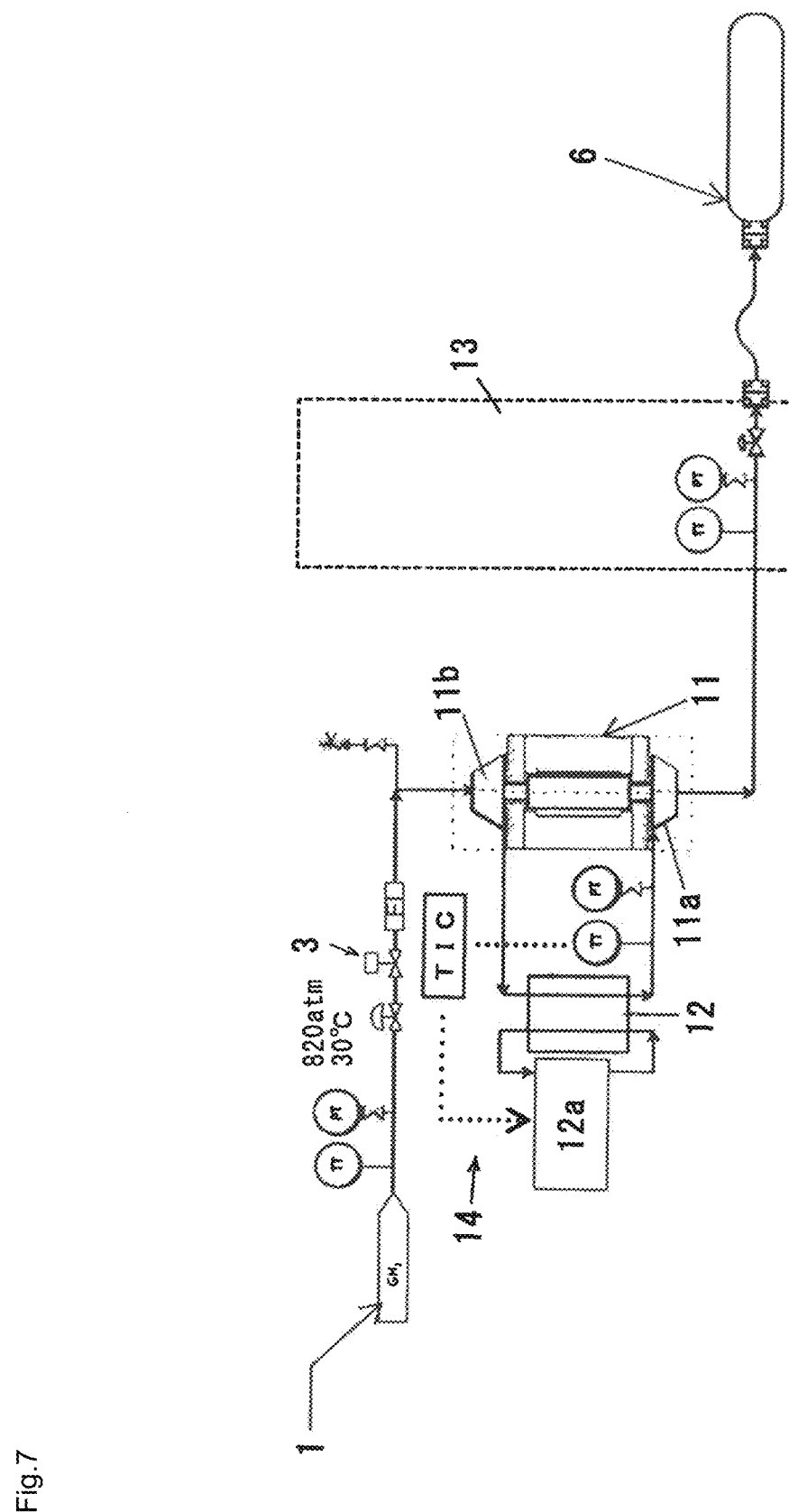
FIG. 7 Explanatory drawing to show an embodiment of system configuration of expansion turbine/compressor type high-pressure hydrogen filling system to implement the control method of the expansion turbine/compressor type high-pressure hydrogen filling system of this invention FIG. 8 Graph to show the relationship between filling completion temperature and turbine efficiency when the temperature of hydrogen gas is changed by providing a cooler at the entrance portion of the expansion turbine side FIG. 9 Explanatory drawing to show an embodiment of the system configuration of the expansion turbine/compressor type high-pressure hydrogen filling system to implement the control method of the expansion turbine/compressor type high-pressure hydrogen filling system of this invention
Figure 8:
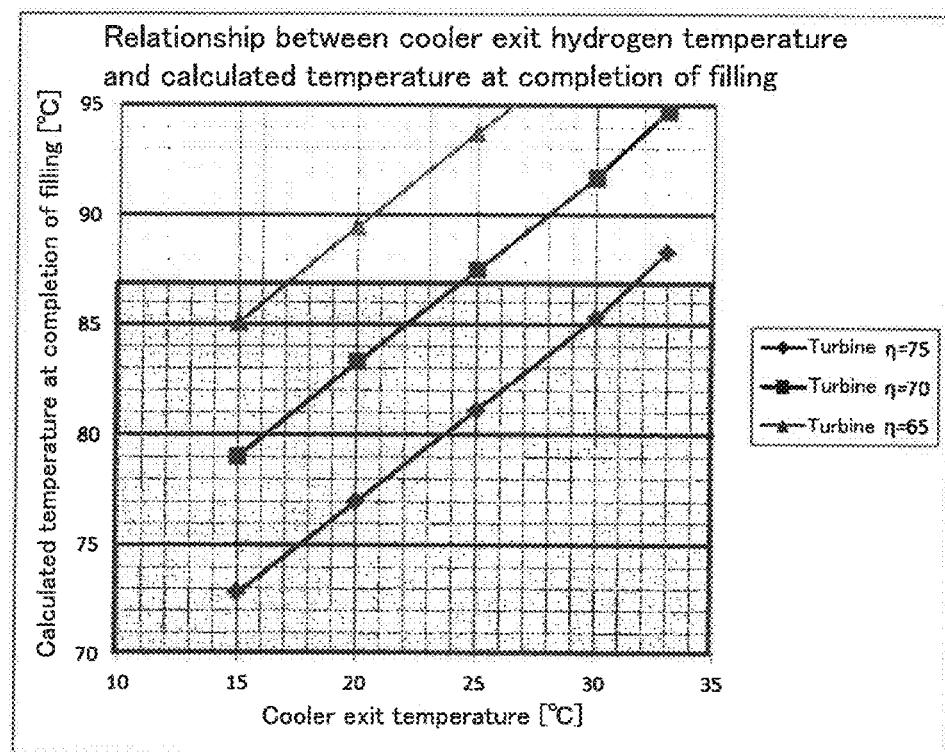

In FIG. 7, by lowering the exit temperature of hydrogen gas of the cooler 12 from ordinary temperature of about 33 C to 25 C or 20 C by means of the controller 14, it is possible to secure room for the temperature rise in the fuel tank 6 after filling, making it possible to design the process with an expansion turbine of lower efficiency, as shown in FIG. 8. That is, the target temperature can be achieved by adjusting the cold of the cooler 12 instead of lowering the temperature with a new cooler.

In this case, it is desirable to detect the exit temperature of hydrogen gas of the cooler 12, set it relatively low during the first filling time (20 to 30 seconds), program proper cold generation as the filling proceeds (as cold load decreases), and have the exit temperature of hydrogen gas follow the target temperature.

Specifically, the control of the protocol to fill hydrogen gas into the fuel tank 6 is to be made by the controller provided in the hydrogen gas supply unit 13. In this case, the filling can be done with minimum external energy without doing wasteful cooling by internally calculating the optimum cold to meet the filling time allocation specified in advance and through optimum control of the entrance temperature of the expansion turbine 11a (exit temperature of cooler 12).

It is also possible to have the exit temperature of hydrogen gas follow the target temperature by detecting the pressure and temperature rise in the fuel tank 6.

Figure 9:
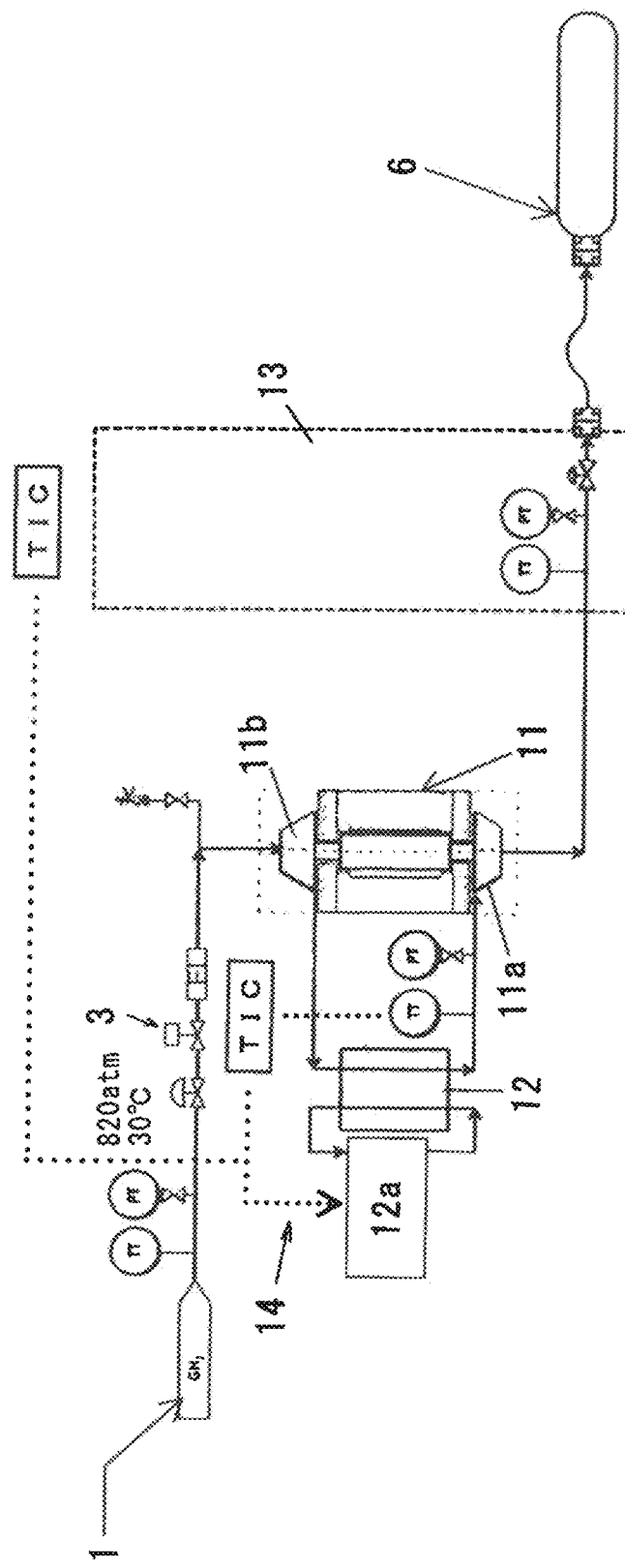

Specifically, it is possible to do the filling with minimum external energy without doing wasteful cooling by detecting the present pressure and temperature of the fuel tank 6 on the hydrogen gas supply unit 13, calculating the optimum cold quantity to the filling completion and controlling optimum the entrance temperature of the expansion turbine 11a (exit temperature of cooler 12) through automatic control, as shown in FIG. 9.

By applying the expansion turbine/compressor type high-pressure hydrogen filling system for the hydrogen pre-cool system used to lower the temperature of hydrogen gas in the final filling portion of the hydrogen station, it is possible to solve as follows the problems of the hydrogen pre-cool system used to lower the temperature of hydrogen gas in the final filling portion of the conventional hydrogen station.

Problem 1): Since the external power is not required for operating the expansion turbine/compressor itself, almost no power is required in comparison with the operating cost (electricity charge) of the conventional hydrogen pre-cool system.

Problem 2): Since the refrigerant does not exist, the system is not subjected to the refrigeration rule. It can be coped with within the High Pressure Gas Safety Act of the entire hydrogen station.

Problem 3): Since the CFC refrigerant and brine itself does not exist, there is no more risk of environmental accidents.

Problem 4): Since system configuration is very simple, not only operating cost but also maintenance cost can be greatly reduced.

Problem 5): Since the temperature lowered state can be created simultaneously with the starting of the expansion turbine/compressor, the time constant within the system is very small. The time of prior starting is small.

Problem 6): Since only the cold box of the expansion turbine/compressor is required, large space-saving is achieved. It is about 10 % in volume ratio in comparison with the conventional system Problem 7): By combining multiple units of expansion turbine/compressor or using expansion turbine/compressor of optimum flow rate, it is possible to easily increase the equipment flow rate and make filling equipment for large fuel cell bus and truck without a large pre-cool cooler.

Problem 8): By using the expansion turbine/compressor, it is not necessary to separately provide a means to take out the energy produced in the expansion equipment and effectively use it, and furthermore, by raising the pressure of hydrogen gas on the compressor side by utilizing the rotating energy obtained on the expansion turbine side and introducing it to the expansion turbine entrance, the expansion ratio of the expansion turbine increases for the pressure raised by the compressor, thus making it possible to obtain the heat drop (cold generation), and by lowering the temperature of hydrogen gas to a proper value by providing a cooler at the entrance portion of the expansion turbine side, it becomes possible to secure some room for temperature at the completion of tank filling and establish a process with an expansion turbine of lower efficiency.

So far the expansion turbine/compressor type high-pressure hydrogen filling system and the control method have been explained in accordance with the embodiments, but the invention is not limited to the configuration described in the above embodiments, and the configuration can be changed as required within the range deviated from the purpose.

Possibility of industrial application

The expansion turbine/compressor type high-pressure hydrogen filling system and the control method of this invention is characterized in that the configuration is simple, site work cost is low, the load of maintenance work is small, the operating cost including the cost of power consumption is small, and it is not necessary to separately provide a means to take out the energy produced in the expansion equipment and effectively utilize outside such as generator, and so it can be preferably used for the application of the hydrogen pre-cool system in the final filling portion of the hydrogen station.

EXPLANATION OF SIGNS

1 Compressor equipment
2 Hydrogen accumulating equipment
3 Expansion valve
4 Pre-cooler
5 Hydrogen pre-cool system
6 Fuel tank (tank)
7 Refrigerator equipment
8 Brine circuit
9 Hydrogen gas source line
10 Hydrogen pre-cool system
11 Expansion turbine/compressor
11a Expansion turbine
11b Compressor
12 Cooler
12a Low temperature heat source
13 Hydrogen gas supply unit

The invention claimed is:

1. A hydrogen filling system comprising:
a tank;
an expansion turbine/compressor that is provided with a-an expansion turbine and a compressor;
a cooler that is provided at an entrance on an expansion turbine side of the expansion turbine/compressor; and
a controller that is configured to:
control an exit temperature of hydrogen gas of the cooler, and
lower a temperature of the hydrogen gas using the expansion turbine when the hydrogen gas accumulated at a predetermined pressure is pressurized and filled into the tank.

2. The hydrogen filling system of claim 1, wherein the expansion turbine includes a first impeller for expansion on a first side of a rotating shaft and the compressor includes a second impeller for compression using rotating energy obtained by the expansion on a second side of the rotating shaft opposite the first side.

3. The hydrogen filling system of claim 1, wherein the expansion turbine/compressor is equipped with bearings of a dynamic gas bearing system using hydrogen gas that is supplied.

4. The hydrogen filling system of claim 1, wherein only one of the expansion turbine/compressor is provided in the hydrogen filling system.

5. The hydrogen filling system of claim 1, wherein the expansion turbine/compressor is one of a plurality of expansion turbine/compressors provided in the hydrogen filling system.

6. A control method of a hydrogen filling system that includes a tank, an expansion turbine/compressor that is provided with an expansion turbine and a compressor, and a cooler that is provided at an entrance on an expansion turbine side of the expansion turbine/compressor, the control method comprising:
controlling an exit temperature of hydrogen gas of the cooler, and
lowering a temperature of the hydrogen gas using the expansion turbine when the hydrogen gas accumulated at a predetermined temperature is pressurized and filled into the tank.

7. The control method of claim 6, wherein the exit temperature of the hydrogen gas of the cooler is detected and a cold energy amount of the cooler is adjusted so that the exit temperature will be a predetermined temperature.

8. The control method of claim 6, wherein when the hydrogen gas is pressurized and filled into the tank, a cold energy amount of the cooler is adjusted so that a predetermined gas temperature is obtained at each filling stage.

9. The control method of claim 6, wherein a pressure and temperature rise of the tank are detected and a cold energy amount of the cooler is adjusted so that a predetermined gas temperature is obtained at each filling stage.

10. The control method of claim 7, wherein the predetermined temperature of the exit temperature is set lower than in a stage where an initial filling is advanced.

* * * * *